(12) United States Patent
De Jong

(10) Patent No.: US 10,951,333 B2
(45) Date of Patent: Mar. 16, 2021

(54) METHOD OF PREDICTING SCATTERING OF AN ELECTROMAGNETIC WAVE AT A SURFACE WITH LOCATION-DEPENDENT SCATTERING PROPERTIES

(71) Applicant: Her Majesty the Queen in Right of Canada, as represented by the Minister of Industry, through the Communications Research Centre Canada, Ottawa (CA)

(72) Inventor: Yvo De Jong, Ottawa (CA)

(73) Assignee: Her Majesty the Queen in the Right of Canada, as represented by the Minster of Industry, through the Communications Research Centre Canada, Ottawa (CA)

( * ) Notice: Subject to any disclaimer, the term of this patent is extended or adjusted under 35 U.S.C. 154(b) by 0 days.

(21) Appl. No.: 16/686,464

(22) Filed: Nov. 18, 2019

(65) Prior Publication Data

US 2020/0162176 A1 May 21, 2020

Related U.S. Application Data

(60) Provisional application No. 62/768,345, filed on Nov. 16, 2018.

(51) Int. Cl.
*H04B 17/00* (2015.01)
*H04B 17/391* (2015.01)

(52) U.S. Cl.
CPC .............. *H04B 17/3913* (2015.01)

(58) Field of Classification Search
CPC .. H04B 17/3913; H01Q 19/10; H01Q 19/185; G01S 1/48; G01S 1/50; G01S 1/62; G01S 1/70; G01S 1/76
See application file for complete search history.

(56) References Cited

U.S. PATENT DOCUMENTS

| | | | |
|---|---|---|---|
| 9,935,375 B2* | 4/2018 | Bowers | H01Q 3/44 |
| 10,233,083 B2* | 3/2019 | Fitzhugh | C01B 32/172 |
| 2012/0268340 A1* | 10/2012 | Capozzoli | H01Q 19/18 |
| | | | 343/836 |

* cited by examiner

*Primary Examiner* — Tuan Pham
(74) *Attorney, Agent, or Firm* — Teitelbaum & Bouevitch; Neil Teitelbaum

(57) ABSTRACT

A method of predicting scattering of an electromagnetic (EM) wave incident on a surface with location-dependent scattering properties such as an engineered electromagnetic surface is based on generalized Snell's Law and includes offsetting a direction of scattering by a vector determined based on the properties of the surface at a particular point of incidence. The method solves the problem of "exact path calculation," by exhaustive search of possible locations for points of incidence, followed by a fine approach, both steps using the data describing the local properties of the surface.

20 Claims, 7 Drawing Sheets

METHOD OF PREDICTING SCATTERING OF AN ELECTROMAGNETIC WAVE AT A SURFACE WITH LOCATION-DEPENDENT SCATTERING PROPERTIES

REFERENCE TO RELATED APPLICATIONS

The present disclosure claims priority from U.S. Appln No. 62/768,345 filed Nov. 16, 2018 which is incorporated herein in its entirety.

TECHNICAL FIELD

The present disclosure relates generally to methods for simulation and prediction of electromagnetic wave propagation and, more particularly, to scattering of electromagnetic waves at engineered electromagnetic surfaces.

BACKGROUND

Engineered electromagnetic surfaces (EESs) are surfaces designed to have anomalous electromagnetic (EM) properties that cannot be found in nature. EESs are typically fabricated on a dielectric substrate and have patterns of metallic, dielectric, resistive, ferroelectric, or semiconductor materials. The patterns are designed so as to alter, in a controlled manner, the propagation behaviour of radio waves. These surfaces can be installed at strategic locations in indoor and outdoor propagation environments in order to improve the coverage or mitigate interference of electromagnetic signals.

EESs can be broadly categorized as reflective or transmissive, periodic or aperiodic, and as uniform or non-uniform, the latter depending on the phase behavior of localized reflection and/or transmission properties. For non-uniform EESs, as their name implies, the phase is made to vary over subwavelength distances across the surface, causing the propagation directions of reflected and transmitted waves to deviate from those dictated by Snell's Law of reflection and transmission. Frequency-selective surfaces are uniform EESs used to reduce interference at specific frequency bands. Specific EES designs are typically tailored to a practical application, and their scattering properties may be determined by means of computer simulation.

Fifth-generation (5G) mobile communications systems are designed for the radio spectrum well above the frequency bands used by today's mobile systems, including millimeter-wave (mm-wave) bands. While the mm-wave spectrum offers a vast amount of bandwidth, it presents new challenges with respect to signal propagation, including strong shadowing by buildings, foliage, diverse urban infrastructure, vehicles and people, and significantly reduced penetration into buildings.

This raises the importance of simulating and predicting propagation of signals in the presence of EESs, evaluating EES effectiveness in a particular environment, and choosing designs and locations. Because of the expected ubiquitous use of EESs, it is important to have a convenient and cost effective simulation tool. Conventionally, such tools for non-engineered surfaces use ray-tracing technology based on geometrical optics (GO) and geometrical theory of diffraction (GTD), which is not applicable for the EESs, because scattering at the engineered surfaces is not governed by Snell's Law.

For simulation of scattering at engineered electromagnetic surfaces, it has been suggested to substitute an EES with an "equivalent" geometrical structure composed of conventional non-engineered materials and adapted to have similar scattering characteristics because of the geometric profile of the surface. In particular, a metal saw tooth profile may be used to approximate the scattering behaviour of a reflective grating. However, such a solution is very difficult to extend to more sophisticated EES designs and it is practically impossible to use for transmissive designs. The saw tooth model is not scalable and is very difficult to automate. It also typically results in high computational complexity and poor accuracy, due in one part to the highly detailed geometrical modelling necessary to approximate the electromagnetic properties of the EES, and in the other part to unintended and physically meaningless ray interactions from and between multiple elements of the equivalent structure.

Accordingly, there is a need for convenient, scalable, and cost effective methods and tools for predicting scattering behaviour of electromagnetic signals at engineered electromagnetic surfaces.

SUMMARY

The instant disclosure provides a method of predicting one or more directions of scattering of an electromagnetic (EM) wave incident on a surface with location-dependent scattering properties. The method includes: (A) providing surface data related to the location-dependent scattering properties at the surface; (B) providing a candidate point of incidence on the surface; (C) for the EM wave incident on the surface, providing a direction of incidence; (D) determining a phase differential at the candidate point, based on the surface data at the candidate point; (E) determining a projection on the surface of a direction of scattering from the candidate point, comprising offsetting a projection on the surface of the direction of incidence by the phase differential; and (F) determining a normal component of a direction of scattering of the electromagnetic wave, using the projection on the surface of the direction of scattering from the candidate point.

In one embodiment, the method further includes: (G) providing a point of observation; (H) evaluating whether each of two scalar projections on the surface of a vector difference between the direction of incidence offset by the phase differential and a direction from the candidate point to the point of observation changes sign in a predefined proximity of the candidate point; (K) if no change of sign detected in step (H), updating the candidate point and repeating steps (D), (E), (H) until the change of sign is detected; and, (L) if the change of sign is detected in step (H), determining a point of incidence based on the candidate point, using second-order differentials determined from the surface data, wherein the direction of scattering is determined as a direction from the point of incidence to the point of observation.

BRIEF DESCRIPTION OF THE DRAWINGS

Exemplary embodiments will now be described in conjunction with the drawings, in which.

DETAILED DESCRIPTION

This disclosure provides an efficient method of simulation and prediction of scattering of an electromagnetic wave incident at a surface with location-dependent scattering properties, such as engineered electromagnetic surfaces (EESs). The result of scattering is one or more scattered electromagnetic waves, which may be reflected, transmitted, and diffracted waves. In terms of the geometrical optics (GO) and geometrical theory of diffraction (GTD), an incident ray, after interaction with a surface, results in one or more rays, each possibly a reflected, transmitted, or diffracted ray.

The method disclosed herein can be applied to surfaces with rapidly (with respect to surface location) and, possibly, independently varying transmission and reflection characteristics, as is the case for EESs. The method is based on analytical findings of the inventor, and relies on a generalization of Snell's Law. Thus, a software package implementing this method may replace implementations based on Snell's Law, and be used as a design, evaluation, and optimization tool for engineered and conventional surfaces in multiple practical applications.

Figure 1A:
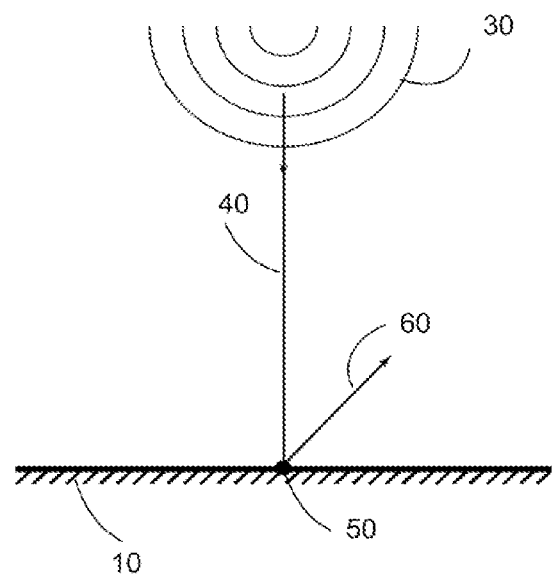
FIGS. 1A and 1B are diagrams of two embodiments of the method.
Figure 1B:
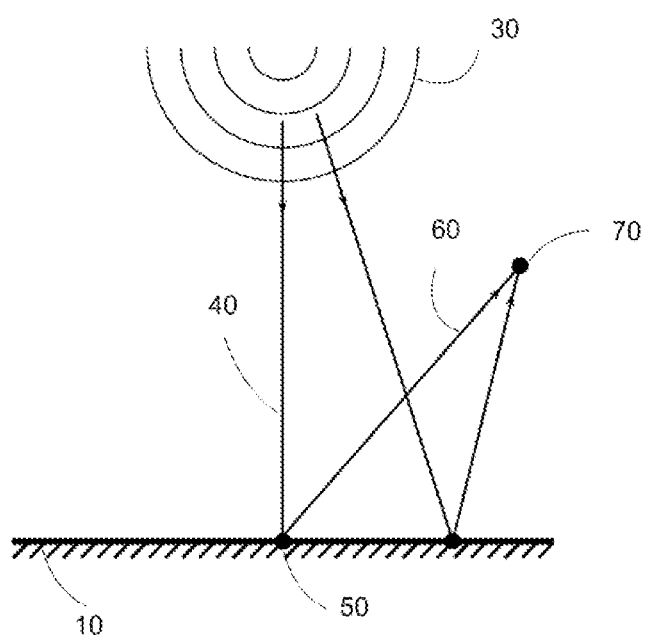

With reference to FIG. 1A and FIG. 1B, a process of scattering at a surface 10 may be described in terms of an incident wavefront 30, a direction of incidence 40, a point of incidence 50, a direction of scattering 60, and a point of observation 70. In practice, only part of these parameters may be provided, and the rest may be found.

FIG. 1A relates to the problem of "ray shooting," when the method is used to simulate or predict the behavior of a ray (or a wave) propagating from a known point source (or transmitter) into a simulated environment composed of scattering objects, while the location(s) of the observation point(s) or receiver(s) are unknown. FIG. 1B relates to the problem of "exact path calculation", when the method may be used to determine the exact propagation path of a ray arriving at a given observation point after interacting with one or more given objects.

A person skilled in the art would appreciate that the directions of incidence or scattering are conventionally identified by vectors of a predefined standard length, typically unit-length vectors. However, for computational purposes, the propagation direction vectors may be scaled so as to have a length different from 1. It may be interpreted as stretching/shrinking the system of coordinates. Furthermore, this disclosure applies the terms "a ray" and "a direction of the ray" interchangeably where it does not cause confusion, understanding that the implementation would include normalization or other type of scaling when necessary.

Figure 2A:
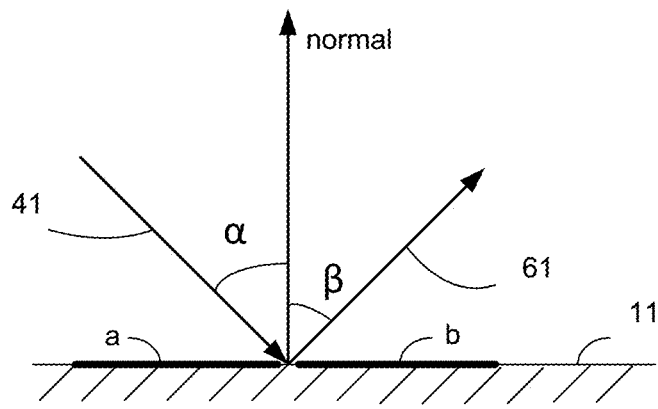
FIGS. 2A, 2B, and 2C are diagrams illustrating a generalization of Snell's Law.

FIG. 2A illustrates Snell's Law in case of simple reflection. For a conventional surface 11 the angle of incidence a is equal to the angle of reflection $\beta$, and a unit-length reflected ray 61 has the same projection b on the surface as the projection a of a unit-length incident ray 41, while their projections on the normal to the surface are equal in length and opposite in direction.

Figure 2B:
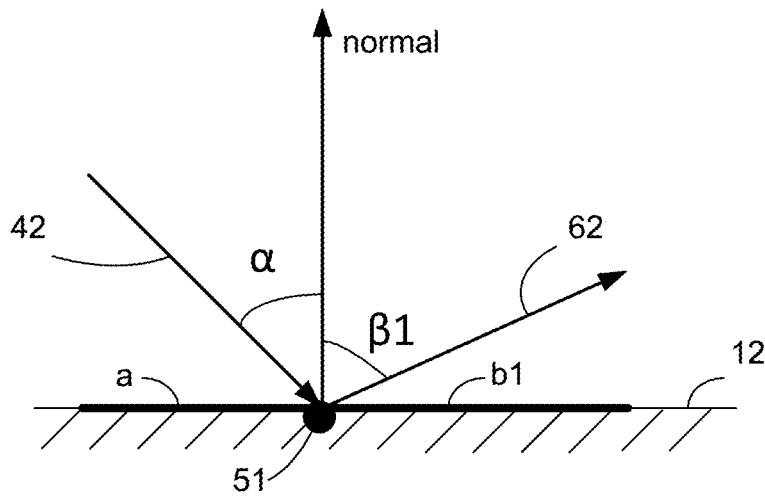

Differently from conventional surfaces, EESs are intentionally engineered to have artificial scattering properties. Generally speaking, Snell's Law is not directly applicable to such surfaces. With reference to FIG. 2B, the angle of reflection $\beta 1$ from an engineered surface 12 in general may be different from the angle of incidence $\alpha$, and a projection b1 of a unit-length scattered ray 62 may be different from a projection a of a unit-length incident ray 42; then normal projections of the incident vector 42 and scattered vector 62 are different in length as well. The differences are caused by specific properties of the EES 12, and often these properties are location dependent. Relative to the EES 12 and other references to engineered surface in this disclosure, the EESs are used as examples and represent other surfaces with location dependent scattering properties.

The instant method of predicting a direction of an electromagnetic wave scattered at an EES expands and modifies the conventional ray-tracing approach by combining ray theory with physical optics (PO) theory. The incident and scattered fields are represented by incident and scattered rays, following the GO (and GTD) approach. However, the interaction of the field with the surface is described using the more sophisticated approach of PO.

Using a ray-optical approximation, it has been shown by the inventor that a scattered wave may be described using a generalization of Snell's Law, based on the description of an EES in terms of location (q)—dependent phase functions $\psi_r(q)$ and $\psi_t(q)$ defining respectively the reflection and transmission coefficients associated with the surface, see Eqs. (4) and (5) in the theoretical portion of this disclosure. With reference to FIG. 2B, the generalized Snell's Law describes the difference between the angles $\beta 1$ and $\alpha$ in terms of location-dependent properties of the surface. In more detail, a difference between the projections of the scattered and incident rays on the surface is proportional to a local gradient of the reflection or transmission phase function $\psi_r(q)$ or $\psi_t(q)$, respectively, for a reflected or transmitted ray, see Eq. (28).

Figure 2C:
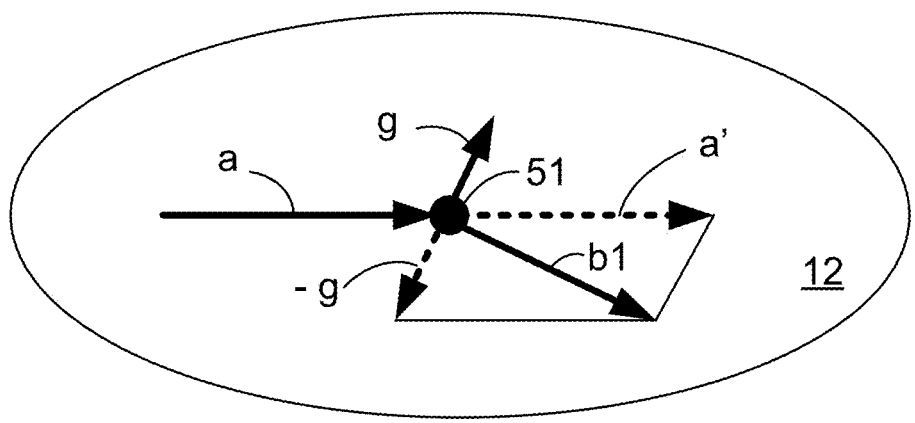

FIG. 2C provides a plan view for the example illustrated in FIG. 2B, wherein a is the projection of the direction of incidence on the surface 12, vector a' is the same vector a moved so as to originate from a point of incidence 51, vector b1 is the projection of the direction of scattering, and g is the gradient or another first order differential of the phase function $\psi_r(q)$ or $\psi_t(q)$, with q being the point of incidence 51. Offsetting the direction of scattering along the direction of a gradient, or its approximation, of the phase function $\psi_r(q)$ or $\psi_t(q)$ may be envisioned as equivalent to scattering in the direction defined by conventional Snell's Law (with no offset), while a portion of the surface wherefrom the scattered ray originates is tilted locally, in accordance with the local change in the phase function of the scattering coefficient. This consideration is implemented in a prior art saw tooth model, which is associated with a variety of problems. The method disclosed herein obviates all defects of the saw tooth approach by using an elegant and far-reaching generalization of Snell's Law.

The method employs a physical optics approach for identifying the point of scattering and the direction of the scattered field and, in this way, accounts for the new physical effects which cannot be described by conventional Snell's Law. At the same time, the input and output of the method may be interpreted more intuitively in terms of geometrical optics, as rays. The fact that the complexity of the physical interaction of the incident wave with the surface is hidden within the method and that users need only to understand rays is important, because people of various professions may be using the method when EESs become ubiquitous. The implementations of the method may be used with other software designed to work with ray-tracing applications.

Offsetting the direction of scattering along the direction of a gradient, or its approximation, of the phase function $\psi_r(q)$ or $\psi_t(q)$ enables the unusual properties for which the EESs are designed to be simulated by means of ray-tracing. The method disclosed herein expands the GO/GTD approach to innovative surface materials and allows for capturing of new surface scattering effects made possible by advances in engineered surface technology.

Figure 3:
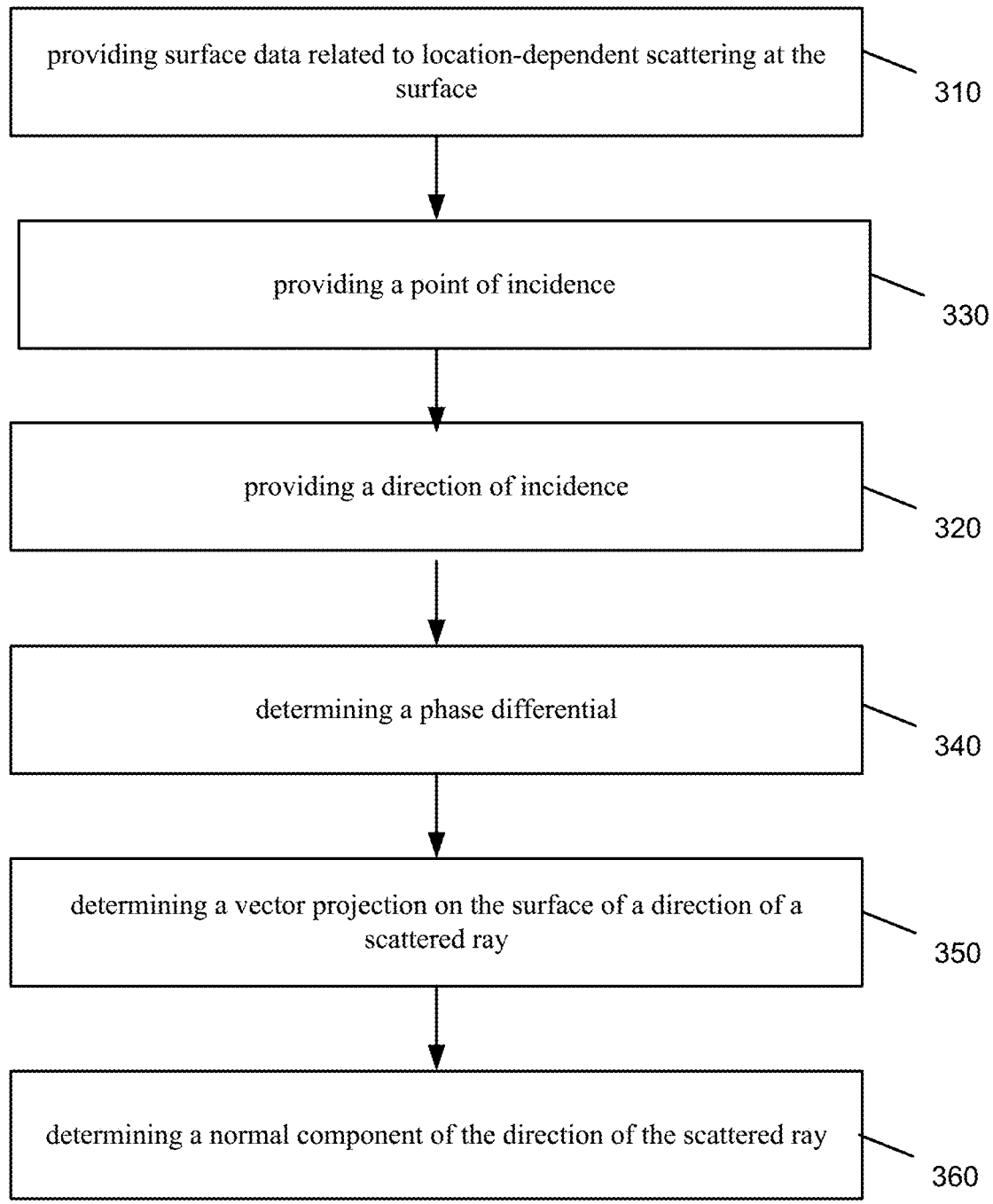
FIG. 3 is a flowchart of an embodiment of the method used for solving the problem illustrated in FIG. 1A.

FIG. 3 is a flow chart of the method used for solving the problem illustrated in FIG. 1A, when the point of incidence is known and the method is used for determining the direction of a scattered wave.

A surface data step 310 includes providing surface data related to location-dependent scattering at the surface. The surface data may be provided in a variety of ways, and parameters required by particular software may be calculated from the provided values by well-known formulae. By way of example, the surface data may be provided in the form of a data file, may be stored in a database, it may be provided in the form of a handle for generating the required surface data, and so on.

The surface data may include values for a reflection or transmission coefficient at multiple points of the surface, or an analytical function representing the coefficient in at least a portion of the surface. The coefficient may be approximated by a complex exponent, and parameters related to the phase function may be provided. The preferred embodiment of the method described herein relies on a gradient of a phase function for the reflection or transmission coefficient, as well as a Hessian describing the second order change in the phase function. A person skilled in the art would appreciate that providing the surface data does not necessarily precede all other steps illustrated in FIG. 3, however a particular portion of the surface data should be provided before it is necessary to use.

An incidence point step 330 includes providing a point of incidence on the surface, and an incident ray step 320—providing a direction of incidence which, in general, depends on the location of the point of incidence. If the source point of the incident ray is provided in the incident ray step 320, but not the direction of incidence, the direction of incidence may be determined as a direction from the source point to the incidence point.

A phase differential step 340 includes determining a phase differential of the first order at the incidence point, based on the surface data at the incidence point. The phase differential may be a gradient value for a reflection or transmission phase function, $\psi_r(q)$ or $\psi_t(q)$, or may be calculated as a difference of phase function values at different points on the surface proximate to the incidence point, etc. Notably, the first-order phase differential and the directions of the incidence and scattering should be scaled at the same scale.

A surface projection step 350 includes determining a vector projection on the surface of the direction of scattering $\hat{k}_s$ in Eq. (28) of the scattered ray originated from the incidence point, comprising offsetting a vector projection on the surface of the direction of incidence by the phase differential, as discussed above with reference to FIG. 2C and formally described by Eq. (28).

A normal projection step 360 includes determining a normal component of the vector identifying the direction of scattering, using the projection on the surface of the direction of scattering found in step 350, and making the length of the vector equal to the predefined length, usually the unit length.

Then the determined direction of scattering also referred to as the scattered ray may be provided to the user, e.g. in a graphical form, or serve as input for another software package e.g. assisting a radio network design.

Figure 3A:
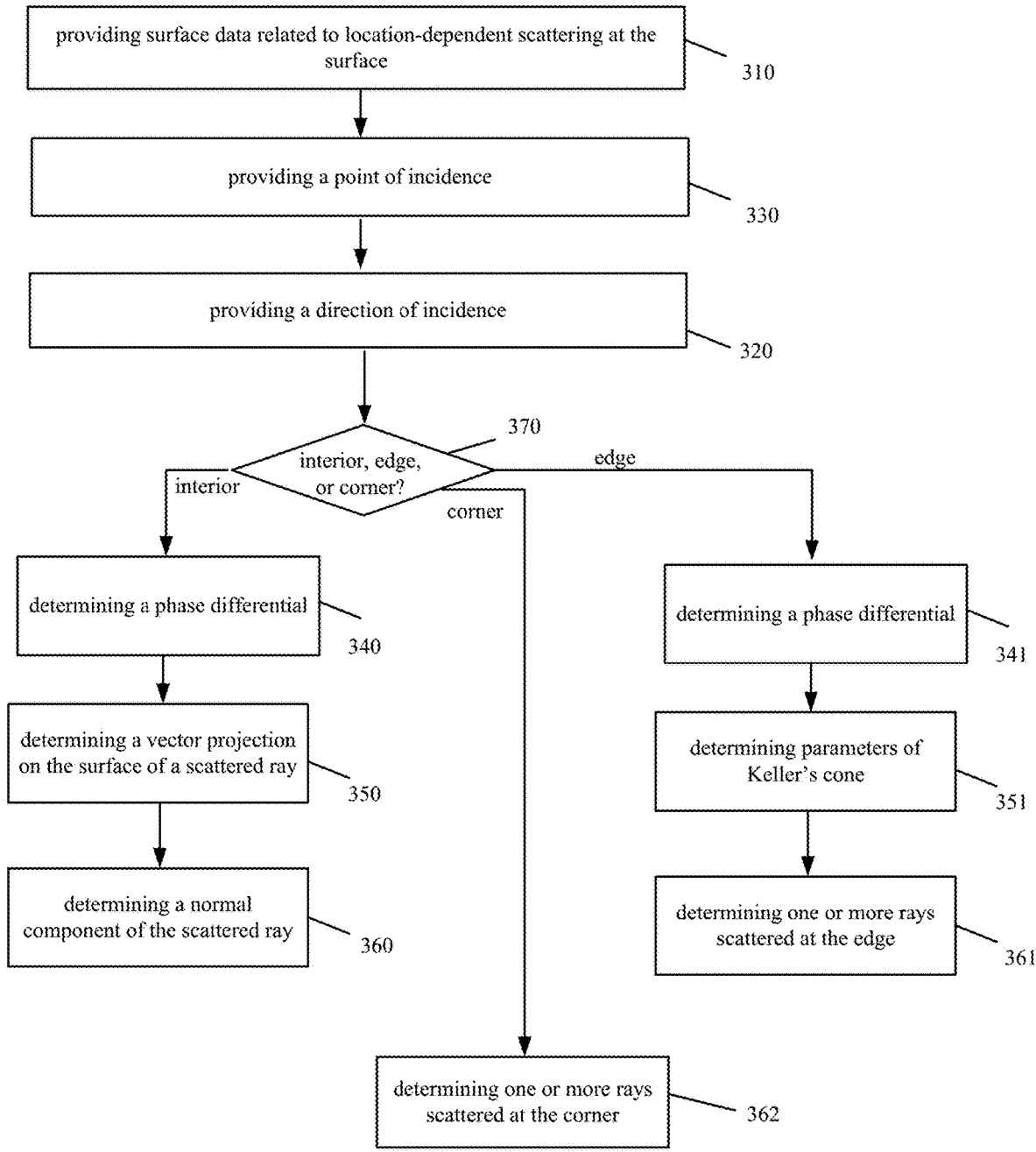
FIG. 3A is a flowchart of an embodiment of the method including a sorting step.

The method illustrated in FIG. 3 determines rays scattered from incidence points internal to the surface, i.e. lying within the interior of the surface. The method may be expanded to define a direction of scattering ray when the point of incidence belongs to the edge of the surface. FIG. 3A illustrates an embodiment of the method including a sorting step 370, determining whether the provided incidence point lies in the interior or on the edge of the surface. If during the sorting step 370 it has been determined that the incidence point belongs to the interior of the surface, the algorithm proceeds to steps 340, 350 and 360 as described with reference to FIG. 3.

If the sorting step 370 has established that the incidence point is on the edge of the surface, but not a corner of the edge, one or more scattered rays will be determined as follows. A phase differential step 341 includes determining a phase differential at the incidence point along the direction of the edge, based on the surface data at the incidence point.

A cone step 351 includes determining one or more parameters of a Keller cone, Eq. (37), representing multiple directions of scattered rays. The cone step 351 may include offsetting a projection on the edge of the direction of incidence by the phase differential determined in step 341 as described by Eqs. (28) and (35). In the case of edge diffraction, the phase differential is a scalar obtained, e.g., by projecting the gradient g on the edge. The half-angle of this cone may be determined based on the direction of incidence offset by the phase differential (projection of the gradient vector on the edge).

A scattered ray step 361 includes determining one or more scattered rays which lie on the surface of the Keller cone. Theoretically, there is a continuum of scattered rays from a particular incidence point on the surface edge. However, an embodiment of the method may provide a limited number of rays, e.g. at discrete, regular or randomly-chosen angular intervals with respect to the Keller cone of candidate scattering directions.

Optionally, the sorting step 370 may include checking whether the incidence point is at a corner of the edge and, if so, the method may include a corner step 362, which provides one or more directions of rays diffracted at the corner of the surface. Theoretically, there is a continuum of scattered rays. However, dependent on the future use of the data related to the scattered field, it may be useful in a particular embodiment to provide a limited number of rays, e.g. at discrete, regular or randomly-chosen angular intervals with respect to a full sphere of candidate scattering directions, as if the diffraction point were a point source.

It should be noted, that the order of steps in the flowchart of FIG. 3, or other flowcharts for this matter, do not necessarily indicate the order of steps. Some of the steps may be performed in a different order, or concurrently. In particular, evaluation of multiple candidate points and processing results of the evaluation may be done by means of parallel computing.

Figure 4:
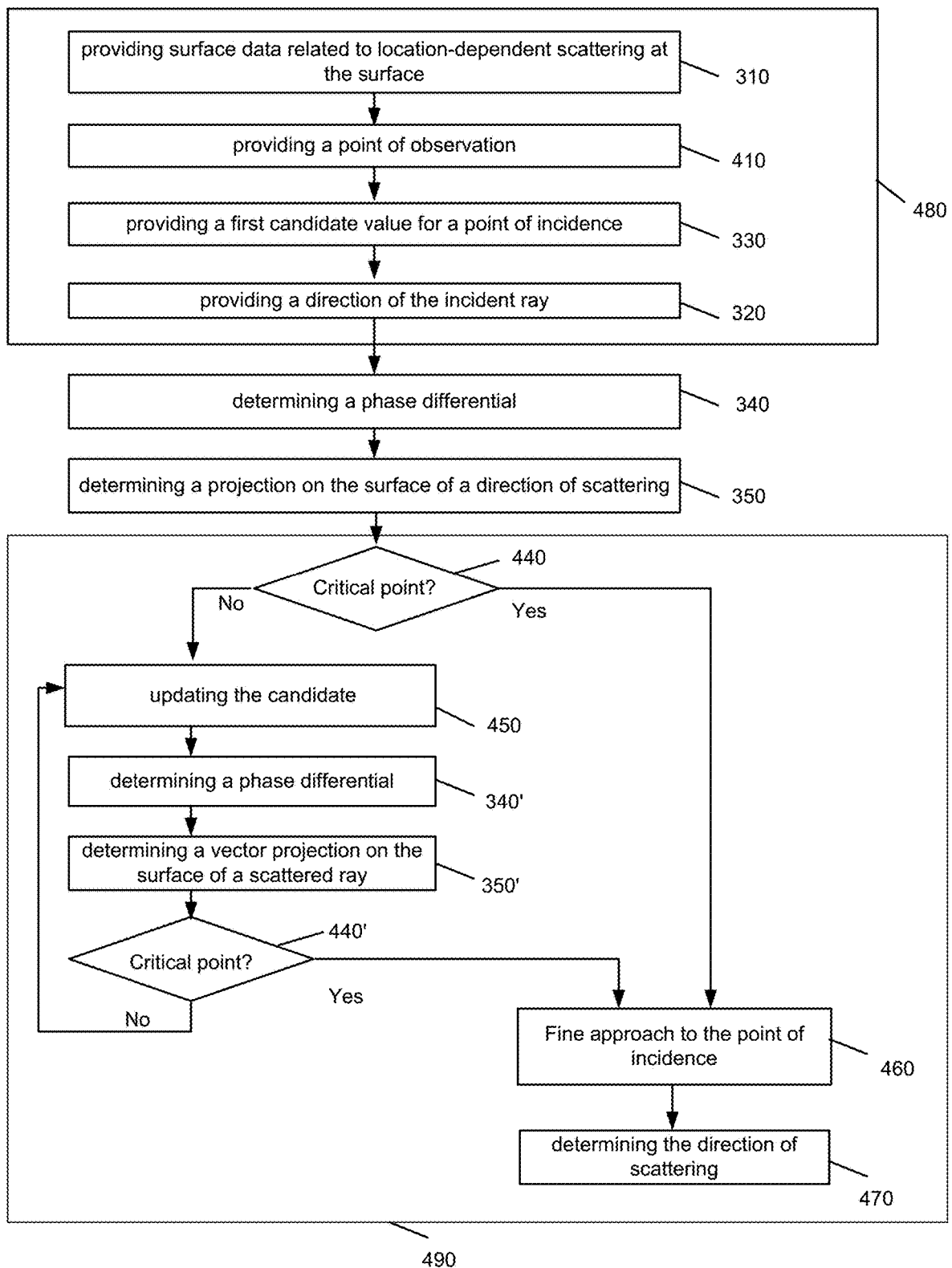
FIG. 4 is a flowchart of an embodiment of the method used for solving the problem illustrated in FIG. 1B.

FIG. 4 is a flow chart of a method used for solving the problem illustrated in FIG. 1B, identifying one or more points of incidence which provide scattered rays to a given point of observation. The method illustrated in FIG. 4 is an embodiment of the method described above with reference to FIG. 3.

In this embodiment, the method includes the surface data step 310, and an observation point step 410 which includes providing a point of observation.

Since the point of incidence is not known, it will be determined by evaluating a series of candidate points. Thus, for solving the problem illustrated in FIG. 1B, the incidence point step 330 provides a first candidate for the incidence point which will be evaluated as described further and, if not satisfied the requirements, will be changed to another candidate as the method executes.

The incident ray step 320 includes providing a direction of incidence which, in general, depends on the location of the first candidate for the point of incidence.

The steps of providing initial data, steps 310, 320, 330, and 410, are not necessarily performed in this order. The only requirement is that a particular piece of data becomes available before it is needed for further execution of the method.

For the first candidate point of incidence, as well as for other candidates in their turn, the phase differential step 340 and the surface projection step 350 (or steps 340' and 350') are executed so as to determine a phase differential at the particular candidate incidence point, and to determine a vector projection on the surface of a direction of scattering from the candidate incidence point, comprising offsetting a vector projection of the direction of incidence by the phase differential.

An evaluation step 440 relates to Eq. 30 and determines whether the candidate point is, or is close to, a critical point of a first kind as described in more detail below.

The evaluation step 440 relates to evaluating whether a given cell contains a critical point for which both of the projections b1 and b2 of Eq. (49) are equal to zero. The critical point condition is satisfied when each of two scalar projections on the surface of a vector difference at the candidate incidence point between the direction of incidence $\hat{k}_I$ offset by the phase differential g and a direction of scattering $\hat{k}_s$, i.e. each of the projections of a vector $(\hat{k}_I\text{-g-}\hat{k}_s)$, changes its sign in a predefined proximity of the particular candidate incidence point. The critical point condition is also satisfied when one of the two projections changes sign within the proximity, and another projection is determined to equal zero in one of the points of said proximity, which may be a grid cell; the detected zero indicates a possible change of sign within the proximity.

If both projections are equal to zero, the candidate point is the point of incidence.

The evaluation may be implemented in a variety of ways.

If the surface is represented by a logical grid of nodes forming cells therebetween, the candidate incidence point may be a node of the grid, and the proximity may be a cell of the grid with the candidate incidence point being a corner of the cell. For each projection, its values may be calculated in two nodes of the cell, either along a side of the cell or along a diagonal; more nodes or other points within the cell may be involved. The subject of evaluation may be a product of two such values for a particular projection as described by Eq. (50). A person skilled in the art would appreciate that each internal node on the grid is adjacent to four cells, and that Eq. (50) may be rewritten with indices changed so as to evaluate the critical point condition for any of the four cells.

Figure 5:
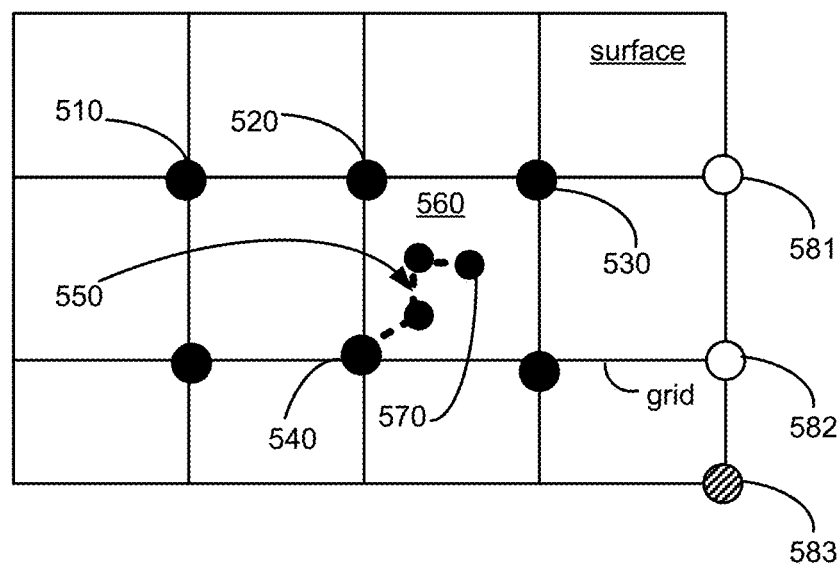
FIG. 5 is a diagram illustrating the embodiments of FIGS. 4 and 7.

If the evaluation step 440 detects no change of sign, a next candidate step 450 is performed. The next candidate step 450 includes updating the candidate point of incidence, i.e. changing the value of the candidate point to another point on the surface, as schematically illustrated in FIG. 5, wherein a point 510 illustrates the first candidate provided in the incidence point step 330. Points 520, 530 and 540 illustrate new values for the candidate, updated in the next candidate step 450 performed several times.

The next candidate step 450 is followed by the phase differential step 340', the surface projection step 350', and the evaluation step 440', which are the same as steps 340, 350 and 440, though performed not for the first candidate value, but for updated values of the candidate point, and therefore not present in the embodiment illustrated in FIG. 3. It should be noted, that updating the candidate incidence point changes the direction of the scattered ray and, possibly, the direction of incidence. Thus, the vectors indicating the direction of incidence and direction of scattering, or at least their projections on the surface, may be updated after each update of the candidate point of incidence.

A point of incidence step 460 is performed when the change of sign is detected in the evaluation step 440 or 440'. The change of sign suggests that a critical point of the first kind is present in the vicinity of the candidate point. The point of incidence step 460 includes determining the point of incidence based on the last candidate point. The fine approach from the suitable (last) candidate for the point of incidence may be performed using a variety of methods, such as using second-order differentials determined from the surface data, e.g. the Newton-Raphson method described by Eq. (51). The second order differentials may be provided as a Hessian tensor, or calculated as a plurality of differences between first order differentials in proximate points on the surface, and so on. The last candidate for the point of incidence may be used as an initial approximation for the fine approach; though, any point in a proximity of the last candidate may be used as the initial approximation as well.

With reference to FIG. 5, the point 540 is the last candidate point resulting from the update step 450. In our example, the point 540 satisfies the change of sign condition 440 or 440' and is used as an initial approximation for a fine approach to the point of incidence performed in the point of incidence step 460, illustrated by a line 550 with small steps within a grid cell 560. A point 570 illustrates the result of the fine approach and may be output as the point of incidence.

A scattered ray step 470 includes determining the direction of scattering as a direction from the just determined point of incidence to the point of observation. The scattered ray step 470 includes determining the normal component of the vector of the direction of scattering. With reference to FIG. 4, step 490 comprises determining the normal component of the direction of scattering of the EM wave, which includes evaluating a projection on the surface of the first direction of scattering from the first candidate point—the evaluation step 440, and evaluating projections of updated directions of scattering from the updated candidates—the evaluation step 440', so as to iteratively arrive at the direction of scattering of the EM wave.

Returning to FIG. 5, a plurality of candidate point values 510, 520, 530, and 540, represent the search for a suitable candidate point 540, where the change of sign is detected in step 440 or 440'. In one embodiment, the search stops at the first suitable candidate, which results in a single point of incidence. The found point of incidence and/or direction of scattering may be preserved in computer-readable memory, output in any form, or provided to another software package.

In another, more preferable embodiment, the method is designed to determine as many incidence points providing scattered rays to the point of observation, as possible. By way of example, FIG. 1B shows two points of incidence wherefrom two different scattered rays arrive at the observation point 70.

Figure 7:
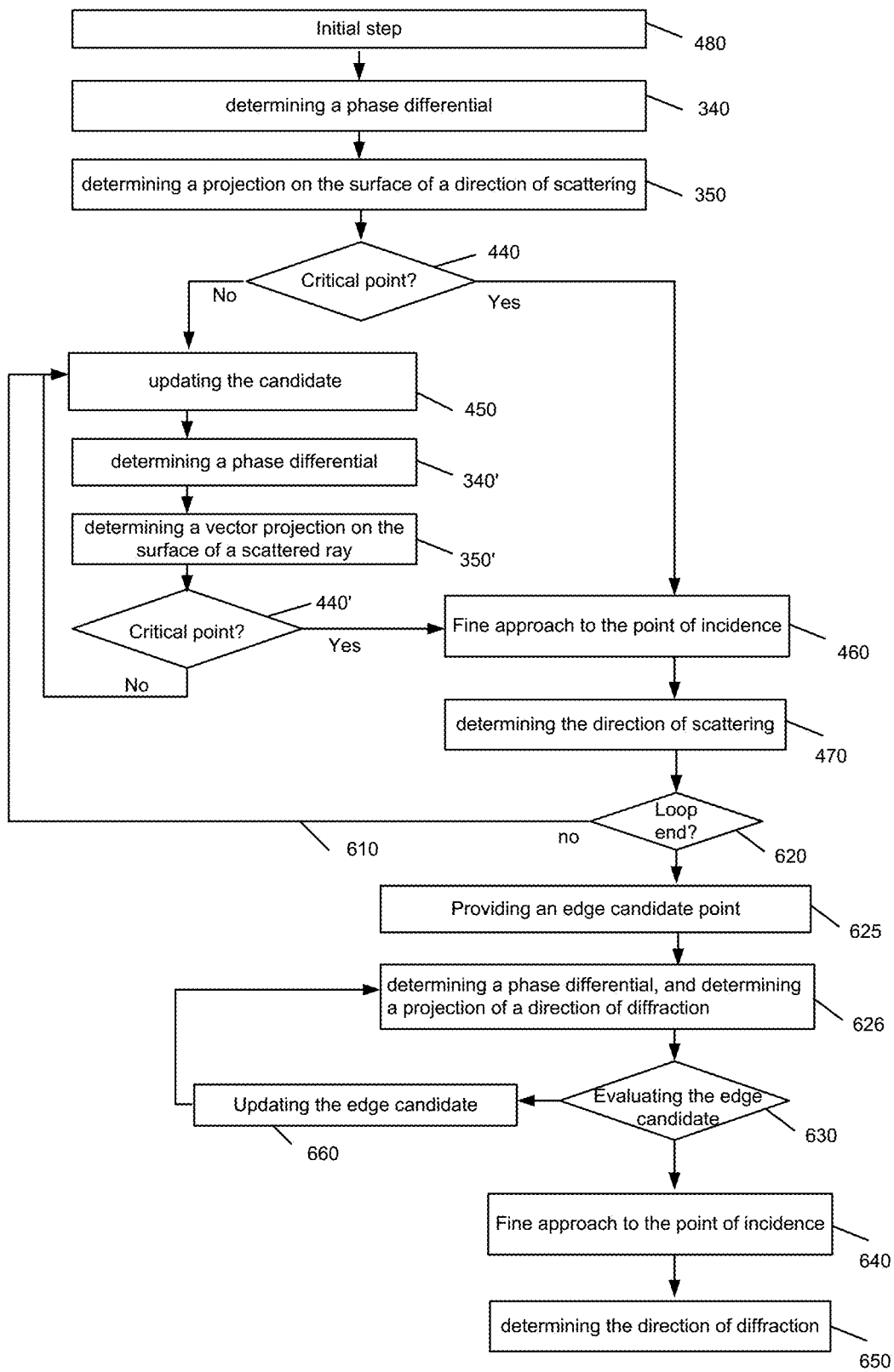

FIG. 7 illustrates the embodiment of the method for determining multiple points of incidence and multiple directions of scattering. The initial step 480 includes steps 310, 410, 330, and 320 described above. In this embodiment, after a first incidence point is found in the fine approach step 460 and preserved or outputted, the candidate point value may be further updated as illustrated by the arrow 610 so as to initiate a search for a next incidence point. The process continues until all available candidate points are exhausted, i.e. include a loop end evaluation 620. By way of example, all nodes of the grid in the interior of the surface may be evaluated as candidate points.

The search for incidence points is exhaustive in the sense that it evaluates the entire surface. With reference to FIG. 5, evaluation of a particular node on the grid, e.g. node 540, means evaluation of an adjacent cell, in our example cell 560, and all cells are evaluated whether they include incidence points wherefrom a ray is scattered towards the point of observation. In another example, candidates may be chosen randomly, and the process stops when a sufficient number of candidate points have been evaluated.

If during the evaluation step 440 or 440' both projections are equal to zero, then the candidate point is a point of incidence and no final approach step is necessary. Then the algorithm can proceed to searching for one more point of incidence.

Optionally but preferably, the embodiment illustrated in FIG. 7 further includes determining one or more incidence points on the edge. FIG. 5 illustrates candidate point values 581 and 582 on the edge of the surface. An edge candidate step 625 includes: providing an edge candidate point on an edge of the surface, such as the point 581 or 582. The edge projection step 626 includes determining a phase differential at the edge candidate point, based on the surface data at the edge candidate point; and determining a projection on the edge of a direction of diffraction from the edge candidate point, comprising offsetting a projection on the edge of the direction of incidence by said phase differential. Then the edge candidate is evaluated in evaluation step 630 and possibly updated in updating the edge candidate step 660. The edge candidate step 625, edge projection step 626, evaluation of the edge candidate point step 630, and updating step 660 are similar to steps related to internal points, adapted to the lesser dimensionality. After a suitable edge candidate is determined in the evaluation step 630, a fine approach is performed in step 640, described by Eq. (52). The fine iterative search finds edge point(s) for which the Keller cone intersects with the given observation point, i.e., for which one of the candidate scattering directions on the Keller cone points to the observation point. A direction of diffraction step 650 includes determining one or more directions of diffraction from the edge, or at least normal components thereof.

In more detail, the method includes providing an edge candidate point on an edge of the surface and determining a phase differential at the edge candidate point, based on the surface data at the edge candidate point. Then a projection on the edge of a direction of diffraction from the edge candidate point is determined, this step includes offsetting a projection on the edge of the direction of incidence by said phase differential determined at the edge candidate point. The evaluation step 630 includes evaluating whether a scalar projection on the edge of a vector difference between the direction of incidence offset by the phase differential and a direction from the candidate point to the point of observation changes sign in a predefined proximity of the edge candidate point. If no change of sign is detected, the edge candidate point is updated and the evaluation and following steps are repeated until the change of sign is detected. If the change of sign is detected, a point of diffraction on the edge is determined based on the edge candidate point, using second-order differentials determined from the surface data, wherein the direction of scattering (diffraction) is determined as a direction from the point of incidence (diffraction) to the point of observation.

The embodiment further includes corner points into the plurality of points of incidence determined by the method, as well as corresponding directions of scattering.

Accordingly, the method solves the problem of "exact path calculation," by exhaustive search of possible locations for points of incidence, followed by a fine approach, both steps using the data describing the local properties of the surface.

Advantageously, the method disclosed herein allows simulation of effects at the surface of both, uniform and non-uniform EESs, without requiring any modifications to the ray-tracing software engine. The method may be used in a variety of practical applications:

In mobile wireless communication systems, base stations are distributed throughout a geographical area to provide ubiquitous communications to mobile wireless end-user devices. Such communications take place by means of radio waves propagating along multiple paths between a base station and an end-user device via various objects in the environment of operation. An important consideration in the design of such systems is the occurrence of coverage gaps where signal strength is insufficient, which may be caused by obstruction of propagation paths by objects such as buildings, trees, street furniture, etc.

The occurrence of coverage gaps can be reduced or prevented by judiciously deploying EESs so as to artificially create propagation paths that would otherwise not exist. These EESs can be embedded, for example, in the exterior cladding of buildings or in billboards. In particular, the coverage in a real-world urban environment can be enhanced by using EESs of the grating and diffuser types. For this application, the grating was designed to deflect a radio wave arriving directly from the base station in a direction where signal strength would otherwise have been low. The diffuser was designed to further extend coverage in an area that would otherwise not have been reached by the deflected propagation path.

The placement and other parameters of the base stations and EESs can be optimized, either separately or jointly, to improve the overall performance efficiency of a wireless communication system. For example, the locations, orientations, sizes, and electromagnetic behaviour of EESs can be optimized so as to minimize the number of base stations needed to cover a certain geographical area. Such optimization requires the availability of propagation prediction software tools capable of estimating propagation characteristics for any possible deployment of base stations and EESs.

The surface data related to location-dependent scattering at the surface obtained by the method in step 310 may be determined at the time of EES design. The designer of an EES uses full-wave electromagnetic simulation software to determine the local reflection and transmission properties of the EES as a function of the surface location. More specifically, if the deposition pattern of an EES design is composed of a two-dimensional lattice of discrete, subwavelength elements referred to as unit cells, the designer determines complex-valued reflection and transmission coefficients for each unit cell. (These coefficients may also be dependent on frequency, incidence angle, and polarization, but this is not considered here.) The EES parameters used by the method disclosed herein may be extracted from the resulting lattices of reflection and transmission coefficients, as described in the next paragraph.

The reflection and transmission coefficients provided by the EES designer are separated into their magnitude and phase components. It is assumed that both the magnitude and phase components can be well approximated by the samples of continuous and smooth functions of the surface location, and that the magnitude function varies only slowly. Based on these assumptions, the magnitude and phase functions are then re-sampled to a user-defined, rectangular grid of surface points, the spacing of which is typically chosen to be much larger than the wavelength in order to keep storage requirements manageable. Estimates of the first- and second-order spatial derivatives of the phase function, referred to as the gradient and Hessian, are also stored for each grid point.

For certain generic EES designs, the EES parameters can be prescribed directly based on theoretical considerations, without the need for full-wave simulations. For example, ideal gratings have a constant phase gradient, which can be determined directly from the desired deflection angle, and a zero Hessian.

The method of this disclosure has been described for engineered electromagnetic surfaces and radio waves. However, the method is applicable to any surfaces with location-dependent scattering properties and even to surfaces where the scattering properties do not depend on location. Furthermore, the method is applicable to any incident electromagnetic field which may be described as having a direction of incidence.

The method disclosed herein may be performed by one or more hardware processors executing instructions implementing steps of the method as outlined in this disclosure. The method may be implemented in software, i.e. as a non-transitory memory having stored thereon instructions which, when executed by one or more processors, cause the processors to perform the steps of the method as described herein. Herein, reference to a computer-readable storage medium excludes transitory forms of signal transmission such as a propagating electrical or electromagnetic signal per se. A computer-readable non-transitory storage medium may be volatile, non-volatile, or a combination of volatile and non-volatile, where appropriate.

The method may be executed in a computer system, which may be an embedded computer system, a system-on-chip, a single-board computer system, a desktop computer system, a laptop or notebook, a mainframe, a mesh of computer systems, a mobile telephone, or a combination of two or more of these. Where appropriate, the computer system may be unitary or distributed; span multiple locations; or reside in a cloud, which may include one or more cloud components in one or more networks. By way of example, the computer system includes a processor, non-transitory memory, storage, an input/output (I/O) interface, a communication interface, and a bus. The processor may retrieve the instructions from an internal register, an internal cache, non-transitory memory, or storage; decode and execute them; and then write one or more results to an internal register, an internal cache, non-transitory memory, or storage.

A Ray-Optical Scattering Model for EES

Introduction

Ray-tracing simulations of radio propagation in environments equipped with engineered electromagnetic surfaces (EESs) require ray-optical models of the electromagnetic scattering from such surfaces. To the best of the author's knowledge, such models are presently not available. Workaround solutions, by which EESs are emulated using geometries that have similar scattering behaviour, have been used with reasonable success. It is not at all evident, however, that this approach will continue to be successful as more and more complex EES designs are evaluated by means of ray-tracing. Clearly it would be much more desirable to have a model available that can handle arbitrary designs, including gratings, diffusers, polarizers, reflectarrays and transmitarrays, and treats them in terms of intrinsic properties used by EES designers, specifically the phase profiles of the surface reflection and transmission coefficients.

To be applicable to ray-tracing simulations, an EES model needs to produce ray parameters associated with the scattered field due to an arbitrary ray-optical incident field, and to permit the scattered ray parameters to be evaluated at arbitrary observation points, either in the far field or at a finite distance from the EES. A model that meets these requirements, and whose computational complexity is sufficiently low, will be of interest for incorporation into commercial ray-tracing software used at CRC. This memorandum provides a theoretical framework for the tracing of reflected, transmitted and diffracted rays, making the model applicable to a wide variety of EES designs and accurately accounting for their finite dimensions.

2. Analysis 2.1 Notation

In the following, bold symbols such as a denote vectors in three-dimensional space. The projection of a on a plane may also be represented by $\underline{a}=[a_1, a_2]^T$, where $a_1$ and $a_2$ are its coordinates with respect to the basis vectors $\hat{u}_1$ and $\hat{u}_2$. Dyadic tensors are denoted by overbarred bold symbols such as $\overline{A}$, and the projection of $\overline{A}$ can be represented by the 2×2 matrix $$\underline{A} = \begin{bmatrix} \hat{u}_1 \cdot \overline{A} \cdot \hat{u}_1 & \hat{u}_1 \cdot \overline{A} \cdot \hat{u}_2 \\ \hat{u}_2 \cdot \overline{A} \cdot \hat{u}_1 & \hat{u}_2 \cdot \overline{A} \cdot \hat{u}_2 \end{bmatrix}. \tag{1}$$

Furthermore, hat signs ˆ denote unit vectors, the superscript T denotes the transpose operator, and a·b and a×b denote inner and outer vector products, respectively.

2.2 EES

Figure 6:
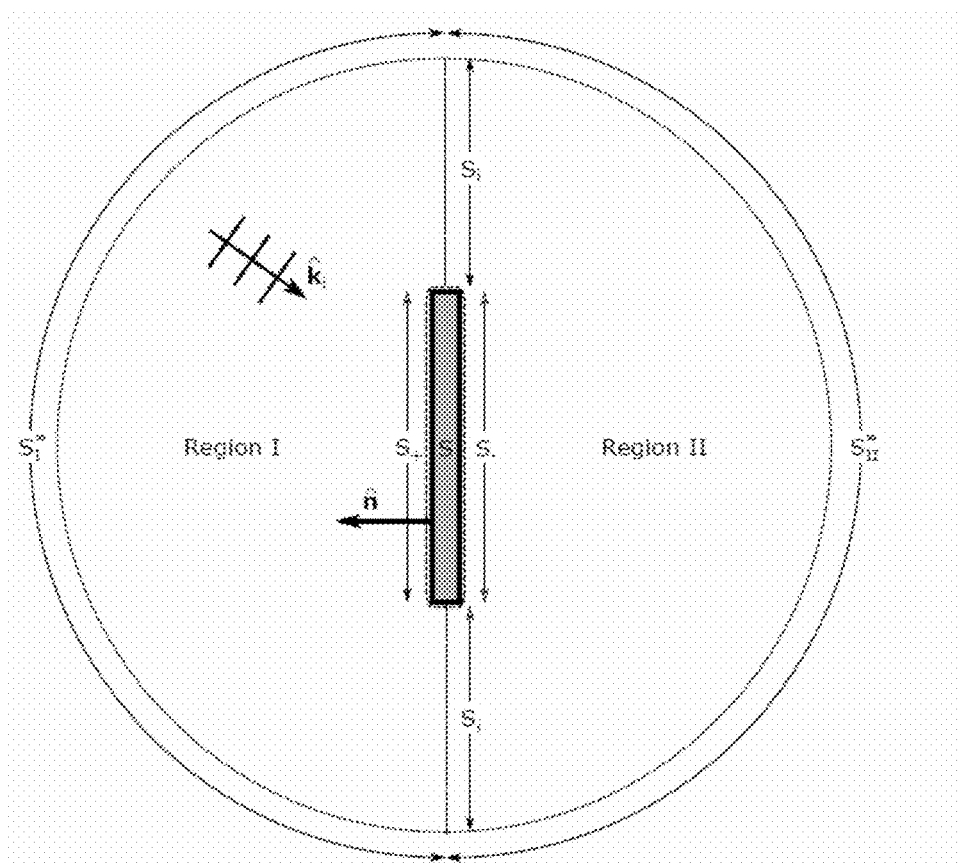
FIG. 6 is a diagram illustrating the geometry pertaining to scattering at an EES; and, FIG. 7 is a flowchart of an embodiment of the method for determining multiple incidence points and directions of scattering.

Consider an EES, denoted by S, which is illuminated by a ray-optical incident field, as illustrated in FIG. 6. S is assumed to be infinitely thin, planar, and bounded by straight edges. The electromagnetic properties of the EES are described by dyadic reflection and transmission coefficients, $\overline{\Gamma}$ and $\overline{\tau}$, that relate the geometrical optics (GO) reflected and transmitted fields on the illuminated and shadow side of the EES, $S_+$ and $S_-$, respectively, to the incident field, $E_i$:

$$E_r = \overline{\Gamma} \cdot E_i \tag{2}$$

$$E_t = \overline{\tau} \cdot E_i \tag{3}$$

Unlike ordinary surfaces, EESs have properties that can be engineered to modify the phase characteristics of the reflected and transmitted fields such that their wavefronts are deflected in non-specular directions or (de)focused to have a different curvature than the incident wavefront. These properties can be described in terms of the location-dependent phase of the reflection and transmission coefficients $$\overline{\Gamma}(q) = \overline{A}_r(q) e^{jk\psi_r(q)} \quad (4)$$

and $$\overline{\tau}(q) = \overline{A}_t(q) e^{jk\psi_t(q)}, \quad (5)$$

whose amplitude functions, $\overline{A}_r$ and $\overline{A}_t$, vary slowly as a function of the surface point location q, and whose phase functions, $\psi_r$ and $\psi_t$, may vary rapidly over the surface, although they are assumed to be well-behaved, i.e., continuous and smooth; k denotes the free-space wavenumber. (Here and in the following, the optional argument notation f (q) specifies that the quantity f is evaluated at the surface point q.) The components of $\overline{\Gamma}$ and $\overline{\tau}$ can be computed with full-wave electromagnetic techniques such as the method-of-moments; in this work, they are assumed to be given.

The local variation of $\psi_r$ and $\psi_t$ about an arbitrary, fixed reference point $q_0$ can be approximated by the quadratic expansion $$\psi_a(q) \cong \psi_a(q_0) + g_{\psi_a}(q_0) \cdot (q - q_0) + \frac{1}{2}(q - q_0) \cdot \overline{H}_{\psi_a}(q_0) \cdot (q - q_0) \text{ for } a = r, t, \quad (6)$$

in which $q = q_0 + u_1 \hat{u}_1 + u_2 \hat{u}_2$ is a surface point near $q_0$, $\hat{u}_{1,2}$ are perpendicular unit vectors in the plane of S, oriented such that the surface normal $\hat{n} = \hat{u}_1 \times \hat{u}_2$ points outward from its illuminated side, and $$g_{\psi_a} = \nabla \psi_a = \frac{\partial \psi_a}{\partial u_1} \hat{u}_1 + \frac{\partial \psi_a}{\partial u_2} \hat{u}_2 \quad (7)$$

and $$\overline{H}_{\psi_a} = \nabla \nabla \psi_a = \frac{\partial^2 \psi_a}{\partial u_1^2} \hat{u}_1 \hat{u}_1 + \frac{\partial^2 \psi_a}{\partial u_1 \partial u_2} \hat{u}_1 \hat{u}_2 + \frac{\partial^2 \psi_a}{\partial u_2 \partial u_1} \hat{u}_2 \hat{u}_1 + \frac{\partial^2 \psi_a}{\partial u_2^2} \hat{u}_2 \hat{u}_2 \quad (8)$$

are the first- and second-order spatial derivatives of $\psi_a$, also referred to as the gradient and Hessian.

2.3 Incident Field

Because the incident field is ray-optical, it can be written as $$E_i(q) = A_i(q) e^{-jk\varphi_i(q)}, \quad (9)$$

in which q is an arbitrary surface point, $A_i(q)$ is a slowly-varying amplitude function, not considered further, and $\varphi_i(q)$ is a wavefront phase function. The latter function may be expanded up to second order in the neighborhood of a fixed reference point $q_0$, as $$\varphi_i(q) \cong \varphi_i(q_0) + \hat{k}_i \cdot (q - q_0) + \frac{1}{2}(q - q_0) \cdot \overline{Q}_i \cdot (q - q_0), \quad (10)$$

where $\hat{k}_i$ is the incident wave direction at $q_0$, and $$\overline{Q}_i = \frac{\hat{x}_1^i \hat{x}_1^i}{\rho_1^i} + \frac{\hat{x}_2^i \hat{x}_2^i}{\rho_2^i} \quad (11)$$

is a curvature dyadic that contains the principal radii of curvature of the incident wavefront, $\rho_{1,2}^i$, and the corresponding principal wavefront directions, $\hat{x}_{1,2}^i$.

2.4 Physical Optics Scattered Field

The radiative field scattered from the EES can be evaluated as $$E_s(p) = C_s^C(p) - E_i(p) U^C, \quad (12)$$

where $$E_s^C(p) = jk \int\!\!\int_C \{\hat{r} \times M(q) + \eta \hat{r} \times \hat{r} \times J(q)\} \frac{e^{-jkr}}{4\pi r} dS \quad (13)$$

represents an integration of equivalent surface current contributions over an arbitrary closed surface, C, encompassing the EES, and $U^c$ is a step function which is equal to unity when the source of the incident field is enclosed by C and vanishes when it is not. In Eq. (13), $\eta$ denotes the free-space wave impedance, $r = r\hat{r}$ is the vector from the integration point q to the observation point p, and M and J are the equivalent magnetic and electric surface currents giving rise to the scattered field.

In this work we consider three different choices of C, illustrated in FIG. 6 and summarized in Table 1, which are associated with different, but equivalent problems (EPs). Because (13) is only valid outside the volume enclosed by C, the solutions provided by EPs 2(a) and 2(b) may be combined to provide the complete scattered field distribution around the EES; together, they will be referred to as EP 2. The equivalent currents on the subsurfaces $S_I^\infty$ and $S_{II}^\infty$ are infinitely far from the radiation source, and can be safely neglected. The scattered field is therefore determined completely by the currents on the boundary plane between Regions I and II, given by $$M_\pm = \pm E_\pm \times \hat{n} \quad (14)$$

and $$J_\pm = \pm \hat{n} \times H_\pm. \quad (15)$$

The subscripts + and − indicate whether these currents, and the associated electric and magnetic surface fields, are evaluated on $S_+$ or $S_-$; $\hat{n}$ is the surface normal pointing into Region I, as indicated in FIG. 6. In the absence of the EES, the scattered field must be zero everywhere. Therefore, $$E_s^{S_+}(p) + E_s^{S_i}(p) = 0 \text{ if } p \text{ is in Region } I \quad (16)$$

$$E_s^{S_-}(p) = E_s^{S_i}(p) \text{ if } p \text{ is in Region } II, \quad (17)$$

provided that $E_i$ and $H_i$ are substituted for $E_\pm$ and $H_\pm$. Here, $E_s^{S_+}(p)$, $E_s^{S_-}(p)$ and $E_s^{S_i}(p)$ denote the partial contributions to (13) from the corresponding subsurfaces. It is noted that, in principle, the three EPs described by Table 1 have identical solutions in their respective validity regions. However, when approximations are made, as will be the case in the following, different equivalents no longer necessarily yield the same results.

TABLE 1

Equivalent Scattering Problems Considered

| EP | Choice of C | Source Enclosed? | Region of Validity | $\overline{F}$ |
|---|---|---|---|---|
| 1 | $S_+ + S_-$ | No | Everywhere | $\overline{F}^i + \overline{F}^r - \overline{F}^t$ |
| 2(a) | $S_+ + S_i + S_{II}^\infty$ | No | Region I | $\overline{F}^r$ |
| 2(b) | $S_- + S_i + S_I^\infty$ | Yes | Region II | $\overline{F}^i - \overline{F}^t$ |

Under the physical optics (PO) approximation, the surface fields are approximated according to geometrical optics (GO), i.e., by the sum of the incident field (9) and the GO reflected field (32) on $S_+$, by the GO transmitted field (33) on $S_-$, and by the incident field on $S_i$. The incident, reflected and transmitted magnetic fields are determined from the corresponding electric fields via the local plane wave approximation:

$$H_a = \frac{1}{\eta} \hat{s}_a \times E_a \text{ for } a = i, r, t, \quad (18)$$

where $\hat{s}_i$ is the propagation direction of the incident wave, and $$\hat{s}_r = \hat{s}_i - 2(\hat{s}_i \cdot \hat{n})\hat{n} \quad (19)$$

and $$\hat{s}_t = \hat{s}_i \quad (20)$$

are the propagation directions of the GO reflected and transmitted waves, respectively. Although this is not made explicit in the notation, $\hat{s}_i$, $\hat{s}_r$, and $\hat{s}_t$ depend on the location of the integration point q, just as $\hat{r}$ and r.

Through substitution and making use of a vector identity, Eq. (12) can be rewritten as $$E_s(p) = jk \int\!\!\int_S \overline{F}(q) \cdot E_i(q) \frac{e^{-jkr}}{4\pi r} dS, \quad (21)$$

where the integration is no longer over a closed surface but over the EES, and $\overline{F}$ is a surface tensor which depends on the EP under consideration, and can be written as the sum of up to three terms with varying signs, as shown in Table 1. Here, $$\overline{F}^a = \begin{cases} \overline{G}^i & \text{if } a = i \\ \overline{G}^r \cdot \Gamma & \text{if } a = r \\ \overline{G}^t \cdot \tau & \text{if } a = t \end{cases} \quad (22)$$

with $$\overline{G}^a = (\hat{n} \cdot \hat{r})\overline{I} - \hat{n}\hat{r} + (\overline{I} - \hat{r}\hat{r}) \cdot [(\hat{s}_a \cdot \hat{n})\overline{I} - \hat{s}_a\hat{n}] \text{ for } a = i, r, t, \quad (23)$$

and $\overline{I}$ is the unit dyad.

The preceding equations and Table 1 show that the scattered field consists of three distinct components, one directly due to the incident field and independent of the reflection and transmission coefficients, and the other two due to the GO reflected and transmitted surface fields. These components will be denoted by $E_s^a(p)$, with a=i, r or t. As will be shown in the next section, the first scattering component, $E_s^i(p)$, cancels the incident field in the shadow zone behind the EES, while the other two, $E_s^r(p)$ and $E_s^t(p)$, are responsible for the backscattered field and the remainder of the forward-scattered field.

2.5 Critical-Point Contributions

In the high-frequency limit, i.e., for $k \to \infty$, the three components of (21) are dominated by discrete contributions from so-called critical points (also called stationary points) on S, resulting in a ray-optical description of the scattered field. The locations of these critical points are generally different for each scattering component, but the associated field contributions can all be written in the same general form $$E_s^a(q_c + s\hat{k}_s) \simeq \frac{jk}{4\pi s} \int\!\!\int_{S_c} \overline{F}^a(q) \cdot E_i(q_c) e^{-jk[\varphi_i(q) + \delta_s(q)]} dS \quad (24)$$

for $a = i, r, t,$ where $q_c$ denotes a critical point, s and $\hat{k}_s$ are an arbitrary observation distance and direction, and $S_c$ is an infinitesimally small subdomain of S around $q_c$. Moreover, $\varphi_s(q)$ is the phase function of the scattered wavefront originating at q, which can be expanded up to second order about $q_c$ as $$\varphi_s(q) = |q_c + s\hat{k}_s - q| \simeq s - \hat{k}_s \cdot (q - q_c) + \frac{1}{2}(q - q_c) \cdot \overline{Q}_s \cdot (q - q_c), \quad (25)$$

with $$\overline{Q}_s = \frac{\overline{I} - \hat{k}_s\hat{k}_s}{s}. \quad (26)$$

Substituting (6), (10) and (25), Eq. (24) can now be rewritten as $$E_s^a(q_c + s\hat{k}_s) \simeq \frac{jke^{-jks}}{4\pi s} \overline{F}^a(q_c) \cdot E_i(q_c) \quad (27)$$

$$\int\!\!\int_{S_c} \exp\!\left\{-jk\left[b^a \cdot (q - q_c) + \frac{1}{2}(q - q_c) \cdot \overline{C}^a \cdot (q - q_c)\right]\right\} dS,$$

where $$b^a = \begin{cases} \hat{k}_i - \hat{k}_s & \text{if } a = i \\ b^j - g_{\psi_a}(q_c) & \text{if } a = r, t \end{cases} \quad (28)$$

$$\overline{C}^a = \begin{cases} \overline{Q}_i + \overline{Q}_s & \text{if } a = i \\ \overline{C}^j - \overline{H}_{\psi_a}(q_c) & \text{if } a = r, t \end{cases}. \quad (29)$$

In the present work we consider critical points of the first, second and third kinds, which are well-known to correspond with GO, edge-diffracted and corner-diffracted ray contributions, respectively.

2.5.1 GO Fields

Critical points of the first kind are those points in the interior of S where the phase of the integrand in (27) is stationary. For critical points of the first kind, the phase of the integrand in Eq. (27) must be stationary with respect to movement over the interior of the integration domain, such that $$b^a \cdot \hat{u}_1 = 0 \text{ and } b^a \cdot \hat{u}_2 = 0. \quad (30)$$

Shadowing of the Incident Field:

If a=i, condition (30) is met if $\hat{k}_s$ is equal to either the incident direction $\hat{k}_i$ or the GO reflected direction, consistent with Snell's law of reflection. It can be shown that, for $\hat{k}_s = \hat{k}_r$, the product $\overline{F}_i \cdot E_i$ reduces to zero. For $\hat{k}_s = \hat{k}_i$, on the other hand, $\overline{F}_i \cdot E_i = 2(\hat{n} \cdot \hat{k}_i)E_i$, and the critical-point contribution (27), if it exists, reduces to $$E_{s,GO}^i(q_c + s\hat{k}_s) \simeq -E_i(q_c) \left|\frac{\rho_1^i \rho_2^i}{(\rho_1^i + s)(\rho_2^i + s)}\right|^{1/2} e^{-jks + jq\pi/2}, \quad (31)$$

where q denotes the number of caustics crossed along the scattered ray path. The reader is referred to Appendix A for more mathematical details. The scattered field component (31) is equal in magnitude to, but has the opposite sign of the incident field (9), therefore cancelling it out for all observation points in Region II for which a stationary point exists in the interior of S (refer to Table 1), i.e., in the optical shadow region behind the EES.

Reflection and Transmission:

If a=r or a=t, condition (30) can be thought of as a generalized Snell's law for EESs. In the special case that the EES phase gradient (7) is uniformly zero, (30) reduces to the conventional Snell's law of reflection (and transmission): incident and reflection angles are equal and, because the EES is infinitely thin and has the same medium (free space) on either side, transmitted rays continue along the path of the incident ray. A non-zero phase gradient "breaks" the conventional Snell's law by deflecting the reflected and transmitted rays into different planes and/or angles. For EESs with arbitrary phase functions, Eq. (30) can be used to determine $\hat{k}_s$ from $\hat{k}_i$ or, alternatively, to find the reflection or transmission point given $\hat{k}_i$ and $\hat{k}_s$. The equation generally has two valid solutions for $\hat{k}_s$, associated with $\hat{k}_s \cdot \hat{n} \gtrless 0$, and the product $\overline{F}^a \cdot E_i$ is generally non-zero for both. Again referring to Appendix A for details, the GO reflected and transmitted fields can be approximated as $$E_{s,GO}^r(q_c + s\hat{k}_s) \simeq \overline{R} \cdot E_i(q_c) \left| \frac{\rho_1^r \rho_2^r}{(\rho_1^r + s)(\rho_2^r + s)} \right|^{1/2} e^{-jks + jq\pi/2}, \quad (32)$$

$$E_{s,GO}^t(q_c + s\hat{k}_s) \simeq \overline{T} \cdot E_i(q_c) \left| \frac{\rho_1^t \rho_2^t}{(\rho_1^t + s)(\rho_2^t + s)} \right|^{1/2} e^{-jks + jq\pi/2}, \quad (33)$$

in which $$\overline{R} = \frac{\overline{F}^r(q_c)}{2|\hat{k}_s \cdot \hat{n}|} \text{ and } \overline{T} = \frac{\overline{F}^t(q_c)}{2|\hat{k}_2 \cdot \hat{n}|} \quad (34)$$

are ray reflection and transmission coefficients, not to be confused with $\overline{\Gamma}$ and $\overline{\tau}$, and $\rho_{1,2}^r$ and $\rho_{1,2}^t$ are the radii of curvature of the reflected and transmitted wavefronts.

2.5.2 Edge-Diffracted Fields

The diffraction contributions from the critical points of the second kind, located on the edges of the integration surface, may be treated separately. Each of these edges is defined by the unit vectors ê, parallel to the edge, and $\hat{t}$, perpendicular (transverse) to the edge and pointed toward the interior of S. For critical points of the second kind, the phase of the integrand in Eq. (27) must be stationary with respect to movement along the edge, such that $$b^a \cdot \hat{e} = 0. \quad (35)$$

If a=i, this condition is satisfied for the Keller cone of scattering directions $\hat{k}_s$ which make the same angle $$\beta^i = \arcsin\sqrt{1 - (\hat{k}_i \cdot \hat{e})^2} \quad (36)$$

with the edge as the incident field. If a=r or a=t, on the other hand, a non-zero partial phase gradient along the edge will narrow or widen the diffraction cone, and Eq. (35) can be used to determine its half-angle $$\beta^a = \arcsin\sqrt{1 - (\hat{k}_s \cdot \hat{e})^2} \quad (37)$$

or, alternatively, to find the diffraction point given $\hat{k}_i$ and $\hat{k}_s$. The contribution from each edge-diffraction point can be expressed as $$E_e^a(q_c + s\hat{k}_s) = \overline{D}_e^a \cdot E_i(q_c) \left| \frac{\rho_e^a}{s(\rho_e^a + s)} \right|^{1/2} e^{-jks + jq\pi/2}, \quad (38)$$

where $\rho_e^a$ is the radius of curvature of the diffracted field in the plane of the edge, $$\overline{D}_e^a = \frac{\overline{F}^a(q_c)}{2\sqrt{2\pi jk} \sin\beta^a (b^a \cdot \hat{t})} F(X^a) \quad (39)$$

is the edge diffraction coefficient, $F(\cdot)$ denotes the UTD Fresnel transition function, and $$X^a = \frac{k \sin^2 \beta^a}{2c^a} (b^a \cdot \hat{t})^2 \frac{\rho_e^a + s}{\rho_e^a s}, \quad (40)$$

$$c^a = (\hat{e} \cdot \overline{C}^a \cdot \hat{e})(\hat{t} \cdot \overline{C}^a \cdot \hat{t}) - (\hat{e} \cdot \overline{C}^a \cdot \hat{t})^2. \quad (41)$$

Mathematical details are provided in Appendix B.

2.5.3 Corner-Diffracted Fields

Critical points of the third kind always exist at the corners (vertices) of the EES, regardless of the behaviour of the phase function. Each corner is defined by its location, $q_c$, and the unit vectors $\hat{e}_1$ and $\hat{e}_2$, which point from $q_c$ along the two constituent edges. The corner-diffracted scattered field is given by $$E_c^a(q_c + s\hat{k}_s) = \overline{D}_c^a \cdot E_i(q_c) \frac{e^{-jks}}{s}, \quad (42)$$

where $$\overline{D}_c^a = \frac{|\hat{e}_1 \times \hat{e}_2| \overline{F}^a(q_c)}{4\pi jk(b^a \cdot \hat{e}_1)(b^a \cdot \hat{e}_2)} T(x_1^a, x_2^a, w^a), \quad (43)$$

$T(\cdot)$ denotes the UTD vertex transition function, and its arguments $$x_{1,2}^a = \sqrt{\frac{k}{2}} \frac{b^a \cdot \hat{e}_{1,2}}{\sqrt{\hat{e}_{1,2} \cdot \overline{C}^a \cdot \hat{e}_{1,2}}} \quad (44)$$

and $$w^a = \frac{-\hat{e}_1 \cdot \overline{C}^a \cdot \hat{e}_2}{\sqrt{\hat{e}_1 \cdot \overline{C}^a \cdot \hat{e}_1} \sqrt{\hat{e}_2 \cdot \overline{C}^a \cdot \hat{e}_2}} \quad (45)$$

are real or imaginary depending on the signs of $\hat{e}_{1,2} \cdot \overline{C}^a \cdot \hat{e}_{1,2}$. Further details are provided in Appendix C.

3. Software Implementation

The EES scattering model described in the previous section has been implemented in a C++ software package, which may be incorporated in commercial ray-tracing software used for propagation simulations. The software lets the user specify a source and an observation point, and the following EES properties:

1) its origin, $q_0$, in three-dimensional space;

2) the orthonormal surface basis vectors $\hat{u}_1$ and $\hat{u}_2$, which in turn define the surface normal $\hat{u} = \hat{u}_1 \times \hat{u}_2$;

3) two one-dimensional arrays of coordinate values $u_1$ (m), m=1,2, ..., M, and $u_2$ (n), n=1, 2, ..., N, which define a rectangular grid of surface points $$q=q(m,n)=q_0+\hat{u}_1+\hat{u}_2(n)u_2 \qquad (46)$$

with dimensions $$U_1 = \max_m\{u_1(m)\} - \min_m\{u_1(m)\} \qquad (47)$$

$$U_2 = \max_n\{u_2(n)\} - \min_n\{u_2(n)\}; \qquad (48)$$

4) two-dimensional, M×N arrays of reflection and transmission amplitude tensors, $\overline{A}_r$ and $\overline{A}_t$, corresponding to the grid points; and 5) two-dimensional, M×N arrays of reflection and transmission phase function values $\psi_a$, gradient vectors $g_{\psi_a}$ and Hessian matrices $H_{\psi_a}$, where a={r, t}.

Importantly, the grid spacings along the $u_1$ and $u_2$-dimensions may be chosen much larger than the wavelength, even if that results in severe undersampling of $\psi_a$. Critical points, i.e., the reflection, transmission and diffraction points at which the incident field interacts with the ES, are determined by means of the following procedures, which may be performed separately for each of the three scattering components, i.e., for a={i, r, t}. We note that the GO contribution $E_{GO}^i$ in (31), and the corresponding critical point of the first kind, do not normally need to be computed; instead, the incident ray is terminated if it is obstructed by the EES, which produces the same result.

Critical points of the first kind are found by means of a coarse, exhaustive search over the grid points, followed by a fine search based on the Newton-Raphson method. In the exhaustive search, an M×N array of two-dimensional vectors $$\underline{b}^a = [b_1^a, b_2^a]^T = \begin{bmatrix} b^a \cdot \hat{u}_1 \\ b^a \cdot \hat{u}_2 \end{bmatrix} \qquad (49)$$

is created by evaluating Eq. (28) for each grid point, and coarse estimates of the critical point locations are obtained by identifying those grid points (m,n) at which both components of $\underline{b}^a$ change signs, i.e., for which $$b_1^a(m,n)b_1^a(m+1,n)<0 \text{ and } b_2^a(m,n)b_2^a(m,n+1)<0. \qquad (50)$$

For numerical stability, it has proved beneficial to offset the origin $q_0$ by a tiny, random amount from its true position. This prevents the components of $\overline{b}^a$ to be exactly zero at a grid point, which complicates evaluation of the criterion (50). Each one of the grid points identified in the coarse search is used as an initial "guess", $\underline{q}_0$, for a two-dimensional Newton-Raphson search with iterations $$\underline{q}_{k+1}=\underline{q}_k[\underline{C}^a(\underline{q}_k)]^{-1}\underline{b}^a(\underline{q}_k), k=0,1,2,\ldots, \qquad (51)$$

where $\underline{q}_k$ denotes the estimated critical point location, in $(u_1, u_2)$ coordinates, after the kth iteration. Due to the regular behaviour of the phase function, this search converges rapidly (quadratically). Computation of the update term in (51) requires $\underline{b}^a$ and $\underline{C}^a$, and hence $g_{\psi_a}$ and $H_{\psi_a}$, to be approximated for arbitrary surface points. This is done by means of bilinear interpolation between the stored grid point values.

Critical points of the second kind, i.e., edge-diffraction points, are determined following a procedure similar to the above, except that it evaluates the scalar $b^a=\underline{b}^a \cdot \hat{e}$ rather than the vector $\underline{b}^a$, and only for surface points on the perimeter of the EES, one edge at a time. Coarse estimates of the critical point locations, if they exist, are obtained by testing for sign changes in $b^a$ between adjacent grid points on the edge. The fine search is performed by means of a one-dimensional Newton search with iterations $$\underline{q}_{k+1}=\underline{q}_k[\underline{e}^T\underline{C}^a(\underline{q}_k)\underline{e}]^{-1}b^a(\underline{q}_k)\hat{e}, k=0,1,2,\ldots, \qquad (52)$$

where $\underline{\hat{e}}$ denotes the edge-parallel vector $\hat{e}$ in $(u_1, u_2)$ coordinates.

Finally, critical points of the third kind, i.e., corner-diffraction points, always exist and coincide with the corner points of the EES, which means that they do not require a search procedure.

Once all critical points have been determined for the given source and observation points, the software computes the corresponding complex ray amplitudes based on the formulas in Sections 2.5.1-2.5.3 and the appendices. Computation of the UTD transition function F(·) in (39) is performed using an approximation by Boersma (J. Boersma, "Computation of Frensel integrals", Math. Comp., vol. 14, p. 380, 1960). The UTD vertex transition function T(·) in (43) is evaluated using an algorithm by Puggelli et al. (F. P. Puggelli, G. Carluccio and M. Albani, "An efficient algorithm for the computation of the UTD T transition function", IEEE Trans. Antennas Propagat., vol. 60, no. 5, pp. 2380-2387, May 2012). It is noted that, unlike previous algorithms, the vertex transition function in Puggelli accepts a combination of real and imaginary argument values. This is necessary when one (but not both) of the radii of curvature of the scattered wavefront is negative, which can occur in practical scenarios, for example with EESs designed to focus the scattered field in one dimension.

4. Numerical Results

Numerical results produced with the aid of the EES scattering model, not reproduced here, show excellent agreement with more rigorous array theory, at much reduced simulation times. For EESs consisting of thousands of unit cells or more, the computational complexity of the new model is several orders of magnitude lower. Compared to the equivalent geometry workaround solution used at CRC in the past, the new method is more accurate, less computationally expensive, and easier to extend to more sophisticated EES designs.

Appendix A: Asymptotic Evaluation of GO Scattered Fields

Consider the Surface Integral $$I(k)=\iint_S A(q)e^{-jk\varphi(q)}dS, \qquad (A.1)$$

in which A(q) is a slowly-varying amplitude function, $$\varphi(q)=\varphi(q_c)+b\cdot(q-q_c)+\frac{1}{2}(q-q_c)\cdot\overline{C}\cdot(q-q_c) \qquad (A.2)$$

is a quadratic phase function, and $\overline{C}$ is of the form $$\overline{C} = \overline{C}' + \frac{\overline{I} - \hat{k}_s\hat{k}_s}{s} \text{ with } s > 0, \qquad (A.3)$$

with $\overline{C}'$ independent of s.

The surface point $q_c$ is a critical point of the first kind if it lies in the interior of S and the integrand phase is stationary with respect to movement around $q_c$, such that the linear phase term vanishes. If this is the case, I(k) can be asymptotically approximated for k→∞ using the method of stationary phase. This yields $$I_{GO}(k) \simeq \frac{2\pi}{k} A(q_c) e^{-jk\varphi(q_c)} \frac{e^{-j\sigma\pi/4}}{|\det \underline{C}|^{1/2}}, \quad (A.4)$$

where the 2×2 matrix $\underline{C}$ denotes the projection of $\overline{C}$ on the plane of S (refer to Section 2.1), and σ is an integer quantity defined such that σ=2 if the eigenvalues of $\underline{C}$ are both positive, σ=−2 if they are both negative, and σ=0 if they have opposite signs.

Using (A.3]), $\underline{C}$ can be written as $$\underline{C} = \underline{C}' + \Theta_s^T \begin{bmatrix} 1/s & 0 \\ 0 & 1/s \end{bmatrix} \Theta_s = \Theta_s^T \left\{ \Theta_s^{-T} \underline{C}' \Theta_s^{-1} + \begin{bmatrix} 1/s & 0 \\ 0 & 1/s \end{bmatrix} \right\} \Theta_s, \quad (A.5)$$

where $$\Theta_s = \begin{bmatrix} \hat{x}_1'^s \cdot \hat{u}_1 & \hat{x}_1'^s \cdot \hat{u}_2 \\ \hat{x}_2'^s \cdot \hat{u}_1 & \hat{x}_2'^s \cdot \hat{u}_2 \end{bmatrix} \quad (A.6)$$

is a projection matrix that premultiplies a surface point $q$ in $(u_1, u_2)$ coordinates such that $\Theta_s q$ is its projection in a local frame spanned by $\hat{x}'_{1,2}{}^d$. The basis vectors $\hat{x}'_{1,2}{}^s$ may be chosen arbitrarily, as long as they are orthogonal to each other and the scattering direction $\hat{k}_s$. Recognizing that the determinant of a matrix product of square matrices equals the product of their determinants, and $$\deg \Theta_s = \det \Theta_s^T = (\hat{k}_s \cdot \hat{n}) \quad (A.7)$$

for any valid choice of $\hat{x}'_{1,2}$, the determinant of $\underline{C}$ can be written as $$\det \underline{C} = (\hat{k}_s \cdot \hat{n})^2 \left( \frac{1}{\rho_1^s} + \frac{1}{s} \right) \left( \frac{1}{\rho_2^s} + \frac{1}{s} \right). \quad (A.8)$$

In this expression, $\rho_1^s$ and $\rho_2^s$ denote the radii of curvature of the GO scattered wavefront, which is determined from the eigenvalues of the curvature matrix $$\Theta_s^{-T} \underline{C}' \Theta_s^{-1} = E \begin{bmatrix} 1/\rho_1^s & 0 \\ 0 & 1/\rho_2^s \end{bmatrix} E^T, \quad (A.9)$$

where $E$ is a matrix whose columns, which represent the eigenvectors of the curvature matrix, yield the principal directions of the scattered wavefront with respect to the arbitrarily chosen basis vectors $\hat{x}'_{1,2}{}^s$.

Eq. (A.4) can now be evaluated as $$I_{GO}(k) \simeq \frac{2\pi}{jk} A(q_c) e^{-jk\varphi(q_c)} \frac{s}{|\hat{k}_s \cdot \hat{n}|} \left| \frac{\rho_1^s \rho_2^s}{(\rho_1^s+s)(\rho_2^s+s)} \right|^{1/2} e^{jq\pi/2}, \quad (A.10)$$

where $q \in \{0,1,2\}$ is the number of negative eigenvalues of $\underline{C}$. This number is equal to the number of singular points, or caustics, crossed (at $s=-\rho_1^s$ and/or $s=-\rho_2^s$) when moving from $s=0$ to the observation distance $s>0$. Such crossings can only occur if at least one of the two radii of curvature is negative.

Appendix B: Asymptotic Evaluation of Edge-Diffracted Fields

Consider again the surface integral given by (A.1)-(A.3). The surface point $q_c$ is a critical point of the second kind if it lies on an edge of S and the integrand phase is stationary with respect to movement along the edge, such that $b \cdot \hat{e} = 0$, where $\hat{e}$ is parallel to the edge. If this is the case, I(k) can be asymptotically approximated as $$I_e(k) \simeq \frac{\sqrt{2\pi}}{k^{3/2}} A(q_c) e^{-jk\varphi(q_c)} \frac{e^{j\pi/4}}{(b \cdot \hat{t})\sqrt{\hat{e} \cdot \overline{C} \cdot \hat{e}}} F(X), \quad (B.1)$$

with $$X = \frac{k}{2} \frac{\hat{e} \cdot \overline{C} \cdot \hat{e}}{\det \underline{C}} (b \cdot \hat{t})^2. \quad (B.2)$$

Here, $\hat{t}$ is the transverse vector defined in Section 2.5.2, $F(\cdot)$ is the UTD Fresnel transition function, and the square root function is defined such that it returns negative imaginary values for negative real arguments.

Using (A.3), the product $\hat{e} \cdot \overline{C} \cdot \hat{e}$, which is the second-order derivative of the phase function along the edge, can be written as $$\hat{e} \cdot \overline{C} \cdot \hat{e} = \sin^2\beta \left( \frac{1}{s} + \frac{1}{\rho_e} \right), \quad (B.3)$$

where $$\sin\beta = \sqrt{1 - (\hat{k}_s \cdot \hat{e})^2} \quad (B.4)$$

is the sine of the diffraction cone half-angle, and $$\rho_e = \frac{\sin^2\beta}{\hat{e} \cdot \overline{C}' \cdot \hat{e}} \quad (B.5)$$

is the radius of curvature of the diffracted field in the plane of the edge. The radius of curvature in the transverse plane is zero, characteristic of cylindrical waves.

Eq. (B.1) can now be evaluated as $$I_e(k) \simeq \frac{\sqrt{2\pi}}{k^{3/2}} A(q_c) e^{-jk\varphi(q_c)} \frac{e^{j\pi/4}}{(b \cdot \hat{t})\sin\beta} F(X) \left| \frac{s\rho_e}{\rho_e+s} \right|^{1/2} e^{jq\pi/2}, \quad (B.6)$$

where q has been defined in Appendix A. The determinant of $\underline{C}$ can be computed as follows:

$$\det \underline{C} = (\hat{e} \cdot \overline{C} \cdot \hat{e}) - (\hat{t} \cdot \overline{C} \cdot \hat{t}) - (\hat{e} \cdot \overline{C} \cdot \hat{t})^2. \quad (B.7)$$

Appendix C: Asymptotic Evaluation of Corner-Diffracted Fields

Consider once again the surface integral given by (A.1)-(A.3). The surface point $q_c$ is a critical point of the third kind if it lies on a corner (vertex) of S. If this is the case, I(k) can be asymptotically approximated as $$I_c(k) \simeq \frac{1}{k^2} A(q_c) e^{-jk\varphi(q_c)} \frac{|\hat{e}_1 \times \hat{e}_2|}{(b \cdot \hat{e}_1)(b \cdot \hat{e}_2)} T(x_1, x_2, w), \quad (C.1)$$

with $$x_{1,2} = \sqrt{\frac{k}{2}} \frac{b \cdot \hat{e}_{1,2}}{\sqrt{\hat{e}_{1,2} \cdot \overline{C} \cdot \hat{e}_{1,2}}} \quad (C.2)$$

-continued and $$w = \frac{-\hat{e}_1 \cdot \overline{C} \cdot \hat{e}_2}{\sqrt{\hat{e}_1 \cdot \overline{C} \cdot \hat{e}_1} \sqrt{\hat{e}_2 \cdot \overline{C} \cdot \hat{e}_2}}.$$ (C.3)

Here, $\hat{e}_1$ and $\hat{e}_2$ are parallel to the two edges constituting the corner; each points from the corner point along its edge. $T(\cdot)$ denotes the UTD vertex transition function and, as previously, the branch of the square root function is chosen such that it returns negative imaginary values for negative real arguments. As a result, $x_1$ and $x_2$ can be both real or both imaginary (and w is real), or $x_1$ ($x_2$) can be real and $x_2$ ($x_1$) and w are both imaginary. Note that $I_c(k)$ is independent of s, which makes the corner-diffracted fields proportional to 1/s, characteristic of spherical waves, for which both radii of curvature are zero.

The invention claimed is:

1. A method of predicting one or more directions of scattering of an electromagnetic wave incident on a surface with location-dependent scattering properties, the method comprising:
   (A) providing surface data related to the location-dependent scattering properties at the surface;
   (B) providing a candidate point of incidence on the surface;
   (C) for the electromagnetic wave incident on the surface, providing a direction of incidence;
   (D) determining a phase differential at the candidate point, based on the surface data at the candidate point;
   (E) determining a projection on the surface of a direction of scattering from the candidate point, comprising offsetting a projection on the surface of the direction of incidence by the phase differential; and,
   (F) determining a normal component of a direction of scattering of the electromagnetic wave, using the projection on the surface of the direction of scattering from the candidate point.

2. The method as defined in claim 1, wherein the direction of scattering from the candidate point is the direction of scattering of the electromagnetic wave.

3. The method as defined in claim 2, wherein the phase differential is a gradient.

4. The method as defined in claim 3, comprising: determining whether the candidate point is within an interior of the surface, performing steps (D), (E), and (F) if the candidate point is within an interior of the surface, and determining a projection of a direction of scattering on the edge and determining one or more scattered rays if the candidate point is on an edge of the surface.

5. The method as defined in claim 2, wherein determining the normal component of the direction of scattering of the electromagnetic wave is based on a length of the projection of the direction of scattering from the candidate point.

6. The method as defined in claim 2, wherein vectors of the direction of incidence and the direction of scattering of the electromagnetic wave have a predetermined length different from 1.

7. The method as defined in claim 6, wherein the phase differential is a gradient multiplied by the predetermined length.

8. The method as defined in claim 1, comprising providing a point of observation and updating the candidate point so as to determine a point of incidence, wherein the direction of scattering of the electromagnetic wave is a direction of scattering from the candidate point after one or more updates thereof.

9. The method as defined in claim 8, comprising:
   (H) evaluating whether each of two scalar projections on the surface of a vector difference between the direction of incidence offset by the phase differential and a direction from the candidate point to the point of observation changes sign in a predefined proximity of the candidate point;
   (K) if no change of sign detected in step (H), updating the candidate point and repeating steps (D), (E), (H) until the change of sign is detected; and,
   (L) if the change of sign is detected in step (H), determining a point of incidence based on the candidate point, using second-order differentials determined from the surface data, wherein the direction of scattering of the electromagnetic wave is determined as a direction from the point of incidence to the point of observation.

10. The method as defined in claim 9, wherein step (L) comprises using the Newton's method.

11. The method as defined in claim 9, wherein updating the candidate point comprises updating the direction of incidence.

12. The method as defined in claim 9, comprising providing a logical grid on the surface and evaluating a plurality of points on the grid, within the interior of the surface, as candidate points of incidence.

13. The method as defined in claim 9, comprising updating the candidate point after the point of incidence has been determined so as to determine another point of incidence and another scattered ray.

14. The method as defined in claim 13, comprising
   (M) providing an edge candidate point on an edge of the surface;
   (N) determining a phase differential at the edge candidate point, based on the surface data at the edge candidate point;
   (P) determining a projection on the edge of a direction of diffraction from the edge candidate point, comprising offsetting a projection on the edge of the direction of incidence by said phase differential determined in step (N);
   (Q) evaluating whether a scalar projection on the edge of a vector difference between the direction of incidence offset by the phase differential determined in step (N) and a direction from the edge candidate point to the point of observation changes sign in a predefined proximity of the edge candidate point;
   (R) if no change of sign detected in step (Q), updating the edge candidate point and repeating steps (N), (P), (Q) until the change of sign is detected; and,
   (T) if the change of sign is detected in step (Q), determining a point of diffraction on the edge based on the edge candidate point, using second-order differentials determined from the surface data, wherein the direction of diffraction is determined as a direction from the point of diffraction to the point of observation.

15. The method as defined in claim 14, determining a direction of a scattered ray along a vector from a corner of the surface to the point of observation.

16. The method as defined in claim 1, wherein the surface is an engineered electromagnetic surface.

17. A non-transitory memory having stored thereon instructions which, when executed by one or more processors, cause the processors to perform the method defined in claim 1.

18. A non-transitory memory having stored thereon instructions which, when executed by one or more processors, cause the processors to perform the method defined in claim 4.

19. A non-transitory memory having stored thereon instructions which, when executed by one or more processors, cause the processors to perform the method defined in claim 9.

20. A non-transitory memory having stored thereon instructions which, when executed by one or more processors, cause the processors to perform the method defined in claim 14.

* * * * *